US006389122B1

(12) United States Patent
Park

(10) Patent No.: US 6,389,122 B1
(45) Date of Patent: May 14, 2002

(54) METHOD AND SYSTEM FOR CONTROLLING AND SWITCHING POWER SOURCE ASSOCIATED WITH ELECTRICAL DEVICES

(76) Inventor: Hyung Sik Park, 202, Songkwang Mansion, #551, Punghyang-Dong, Buk-Ku, Kwangju City 500-090 (KR)

( * ) Notice: Subject to any disclaimer, the term of this patent is extended or adjusted under 35 U.S.C. 154(b) by 0 days.

(21) Appl. No.: 09/171,338
(22) PCT Filed: Feb. 4, 1998
(86) PCT No.: PCT/KR98/00022
 § 371 Date: Oct. 20, 1998
 § 102(e) Date: Oct. 20, 1998
(87) PCT Pub. No.: WO98/35512
 PCT Pub. Date: Aug. 13, 1998

(30) Foreign Application Priority Data

Feb. 5, 1997 (KR) .............................................. 97-3469

(51) Int. Cl.$^7$ ............................................. H04M 11/00
(52) U.S. Cl. ................... 379/102.01; 379/39; 379/41; 379/102.02; 379/102.03; 379/102.04; 379/102.05; 379/102.07; 379/106.01
(58) Field of Search ........................ 379/90.01, 102.01, 379/102.02, 102.03, 102.04, 102.05, 106.01, 102.07, 106.04, 37, 39, 40, 41, 42

(56) References Cited

U.S. PATENT DOCUMENTS

| | | | | |
|---|---|---|---|---|
| 4,174,517 A | * | 11/1979 | Mandel | 340/310.02 |
| 4,353,502 A | * | 10/1982 | Myers | 236/47 |
| 4,419,666 A | * | 12/1983 | Gurr et al. | 379/102.01 |
| 4,656,651 A | * | 4/1987 | Evans et al. | 379/15.03 |
| 4,748,654 A | * | 5/1988 | Gray | 379/40 |
| 4,791,658 A | * | 12/1988 | Simon et al. | 379/41 |
| 4,845,773 A | * | 7/1989 | Attallah | 379/102.05 |
| 4,899,217 A | * | 2/1990 | Macfadyen et al. | 725/80 |
| 4,933,633 A | * | 6/1990 | Allgood | 324/142 |
| 5,119,412 A | * | 6/1992 | Attallah | 379/102.07 |
| 5,544,036 A | * | 8/1996 | Brown, Jr. et al. | 341/825.24 |
| 5,610,576 A | * | 3/1997 | Su | 340/429 |

FOREIGN PATENT DOCUMENTS

JP 403246731 A * 2/1990

* cited by examiner

Primary Examiner—Ahmad F. Matar
Assistant Examiner—Bing Bui
(74) Attorney, Agent, or Firm—Wilson Sonsini Goodrich & Rosati

(57) ABSTRACT

The present invention relates to a switching system which can control a corresponding load by means of manipulating a manual switch and a remote control switch, and optionally turn on/off any load among a plurality of loads via a telephone line even though a user is at any distant places beyond the remote control of loads. The switching system of the present invention recognizes an allowed subscriber by inputting a predetermined password, and confirms an turning-on/off state of loads connected to a switching set unit via a voice to then control turning-ON/OFF of the corresponding load via button manipulation of a telephone set. Accordingly, the switching system can perform manual switching control or remote switching control using a remote controller, and also carry out switching control with regard to any load via the telephone line even under a poor condition of remote control, thereby conveniently confirming and manipulating a state of loads regardless of places.

8 Claims, 5 Drawing Sheets

METHOD AND SYSTEM FOR CONTROLLING AND SWITCHING POWER SOURCE ASSOCIATED WITH ELECTRICAL DEVICES

TECHNICAL FIELD

The present invention relates to a switching system for turning on/off a plurality of loads, and more particularly, to a switching system which can control a corresponding load by means of manipulating a manual switch and a remote control switch, and optionally turn on/off any load among a plurality of loads via a telephone line even though a user is at distant places beyond the remote control of loads.

BACKGROUND ART

Generally, there has been used a manual switch for manual manipulation or a remote control switch with a remote controller for connecting and disconnecting a power source being supplied to lamp appliances indoors. However, a conventional switching system has a drawback that users always operate manual switches in their original places.

To solve the above problem, technique which can optionally perform a switching operation with regard to a power source of loads set up in a plurality of chambers blocked off from each other and warn against a state of emergency, is disclosed in Korean patent application entitled "Switching system" filed on Feb. 16, 1995 by the same applicant. The present disclosure is based on the technique that the plurality of loads can be turned on/off easily using a manual switch and a remote control switch without directly manipulating a corresponding switch. However, in the case where a user is at distant places beyond the remote control of loads with a remote controller, the turning on/off state of loads can not be confirmed and turning-ON/OFF of the corresponding load is out of control.

Taking account into this point, the above-mentioned reference can control the turning-ON/OFF of loads by manipulating buttons on user's telephone set only when a receiving unit is connected to a remote controller, and a password assigned to the receiving unit is identical with a received number. However, there is a drawback that switching control can not be performed with regard to a corresponding load, under condition of the receiving unit not being connected to the remote controller during user's absence.

DISCLOSURE OF INVENTION

Therefore, to solve the above problem, it is an object of the present invention to provide a switching system which can control a corresponding load by means of manipulating a manual switch and a remote control switch, confirm a turning on/off state of a plurality of loads as voice via a telephone line at distant places beyond the remote control of loads, and optionally turn on/off any load via automatic answer by manipulating buttons on user's telephone set.

To accomplish the above object of the present invention, there is provided a switching system for switching a power source being supplied to a plurality of loads, the switching system comprising:

at least two or more units, each including a switching portion composed of switches for applying a control signal to control the plurality of loads, a control signal generator individually electrically connected to each switch, for operating according to the control signal applied from any switch, and a display unit for displaying a control state of the loads;

unit transmission/receiving means for transmitting and receiving the control signal of the individual unit;

means for supplying and cutting off the power source to a desired load according to the output signal of the control signal generator in the unit; and a telephone line connector for receiving an input command applied via a telephone line, outputting a predetermined load control response signal, in response to the input command by an allowed subscriber, so that the control signal generator of the unit can turn on/off a corresponding load, and converting information regarding the turning-ON/OFF state or turning-ON/OFF control operation of the corresponding load into a voice signal to then transmit the converted signal to the subscriber.

BEST MODE FOR CARRYING OUT THE INVENTION

The embodiment of the present invention will be described below with reference to the accompanying drawings.

The present invention performs an operation controlling a corresponding load by means of a manual switch and a remote control switch as disclosed in Korean patent application entitled "Switching system" filed by the same applicant, and also controls switching of the corresponding load via a telephone line at distant places beyond the remote control of loads. The switching system according to the present invention is composed of a plurality of units each unit being constructed as a main switching set or a sub-switching set. The main switching set can perform all functions such as turning-ON/OFF of loads connected to the system, monitoring of turning on/off conditions, etc., and the sub-switching set having a structure that part of functions of the main switching set is omitted and simplified, can perform only essential functions such as turning-ON/OFF of loads connected directly to the sub-switching set or turning-ON/OFF under the control of the main switching set. However, combination between a unit composed of the main switching set and a unit comprised of the sub-switching set allows a plurality of loads to be utilized effectively at a low cost. Therefore, a manufacturing cost can be reduced, and the sub-switching set can be used as a subsidiary switch or a spare switch for emergency.

A manually switching operation is performed by directly manipulating a switch for controlling the corresponding load. Either a remote control method using a remote controller or a paging control method of connecting the receiving unit to a remote controller to perform a switching control, communicates with the main switching set or the sub-switching set of each unit to then carry out a control operation. In a method for controlling loads of the main switching set or the sub-switching set of each unit via a telephone line, a telephone line connector communicates with each unit, and then a switching control operation is performed.

Specially, one embodiment including a microcomputer and peripheral devices in which a basic Spec of the present invention is programmed, allocates different respective addresses to each of loads and performs a control operation based on the addresses.

Prior to describing the operation of the present invention, the switching control of loads by a manual manipulation and a remote control is described on the basis of the disclosure of the above-mentioned reference "Switching system", and then the turning-ON/OFF of each load via a telephone line is mainly described.

Figure 1:
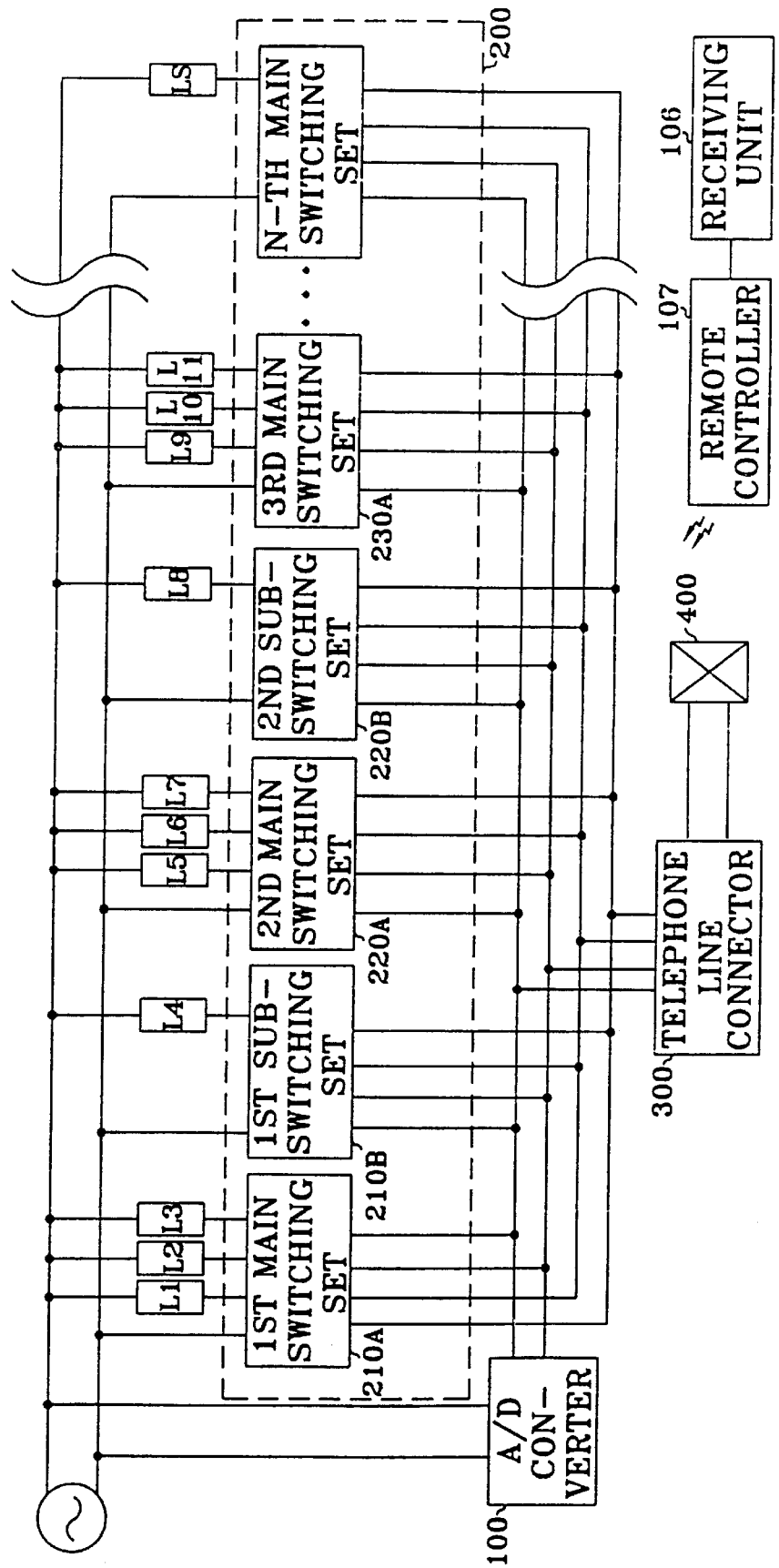
FIG. 1 is a circuit diagram of a switching system in accordance with one embodiment of the present invention.

FIG. 1 is a circuit diagram of a switching system in accordance with the present invention. As shown, the switching system comprises switching unit 200 coupled to a plurality of loads L1, L2, L3 . . . LS which are connected to a power source of an alternating current, for turning on and/or off a corresponding load, a remote controller 107 for performing a remote control operation with regard to a load connected to the switching means 200, and a receiving unit 106 to which the remote controller 107 is connected, for controlling the loads L1, L2, L3 . . . LS of each unit.

Also, the present invention further comprises a telephone line connector 300 which is connected to and contacts with units each being composed of a main switching set and/or a sub-switching set, for outputting a control signal to switch a corresponding load according to a control command of each load applied via an exchange 400, and transmitting to a user side a voice signal corresponding to the turning-ON/OFF or the control operation with regard to loads of each unit.

Figure 2A:
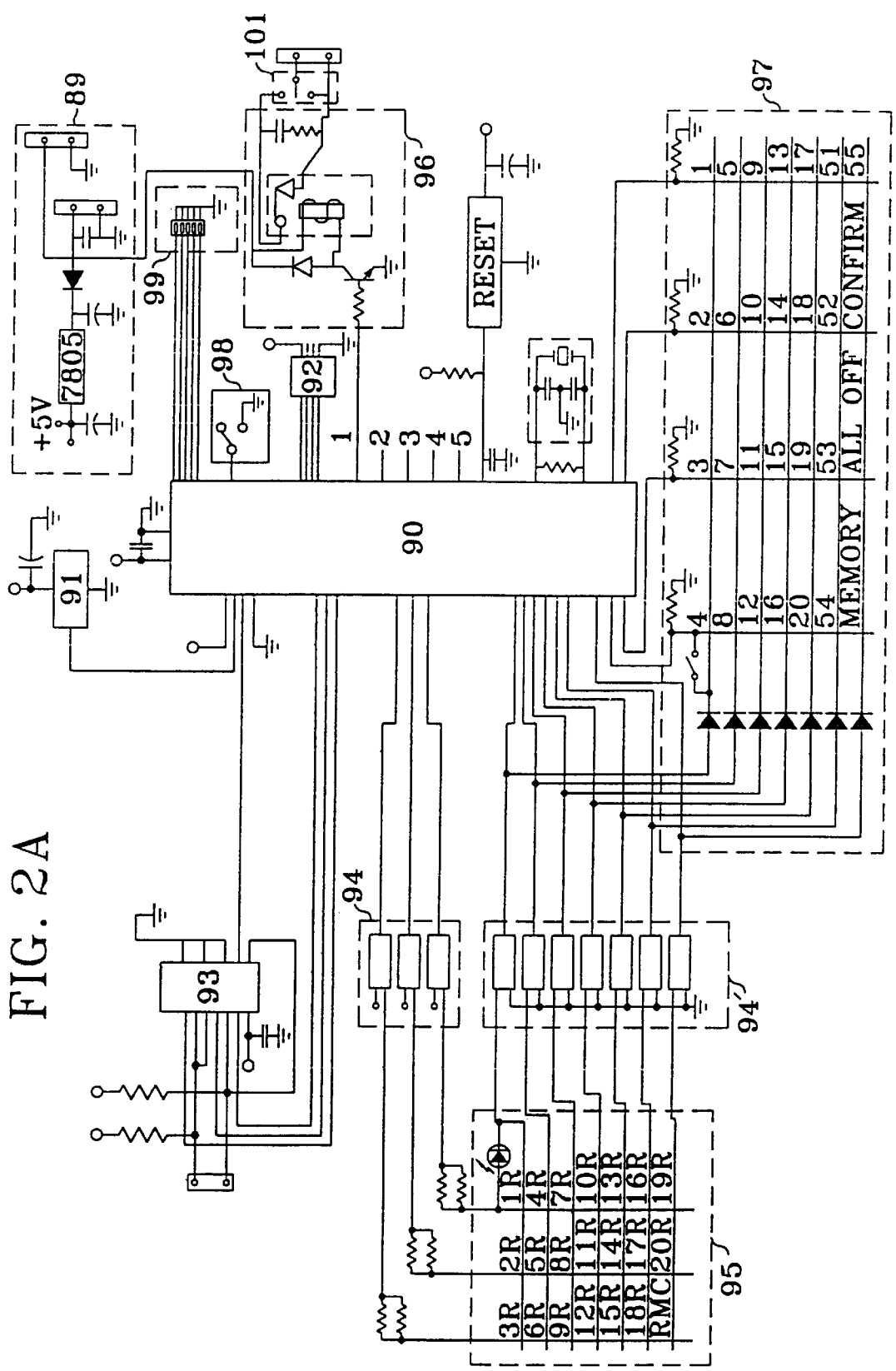
FIGS. 2A to 2C are circuit diagrams showing a main switching set and/or a sub-switching set of FIG. 1 in accordance with the present invention.

First, the operation of controlling the turning-ON/OFF of each load according to a manual and remote control switch is described as an example. FIG. 2A is a detailed circuit diagram showing a main switching set and/or a sub-switching set of FIG. 1 in accordance with one embodiment of the present invention.

A control signal generator 90 receives a switching manipulation signal from a switching portion 97 composed of a plurality of switches 1~20 and S1~S5 and a remote control signal of a remote receiver 91, and applies an output signal to a load controller 96. The load controller 96 drives a transistor and coil-type relay to control turning-ON/OFF of the load.

Here, the control signal generator 90 employs the microcomputer mentioned above. The control signal generator 90 is referred to as a microcomputer 90 hereinafter. Also, a light emitting diode (LED) driving controller 94 and 94' and a light emitting diode (LED) display unit 95 receives the same signal, and the LED display 95 indicates the turning-ON/OFF state of loads in red or green color. The transmission/receiving unit 93 which transmits and receives signals between respective units and, for transmitting and receiving a signal with a telephone line connector 300 described hereinafter.

The switches S1~S5 of the switching portion 97 is designed to be easily used in a switching set installed in an individual chamber.

A load selector 92 is designed to be constructed as EEPROM for setting an address so that a specific load can be regulated by button manipulation of each switch. A load control limit unit 99 limits an on/off operation with respect to any specific load. A confirmatory unit 98 performs an ALL OFF function and confirming a state display of a LED.

Figure 2B:
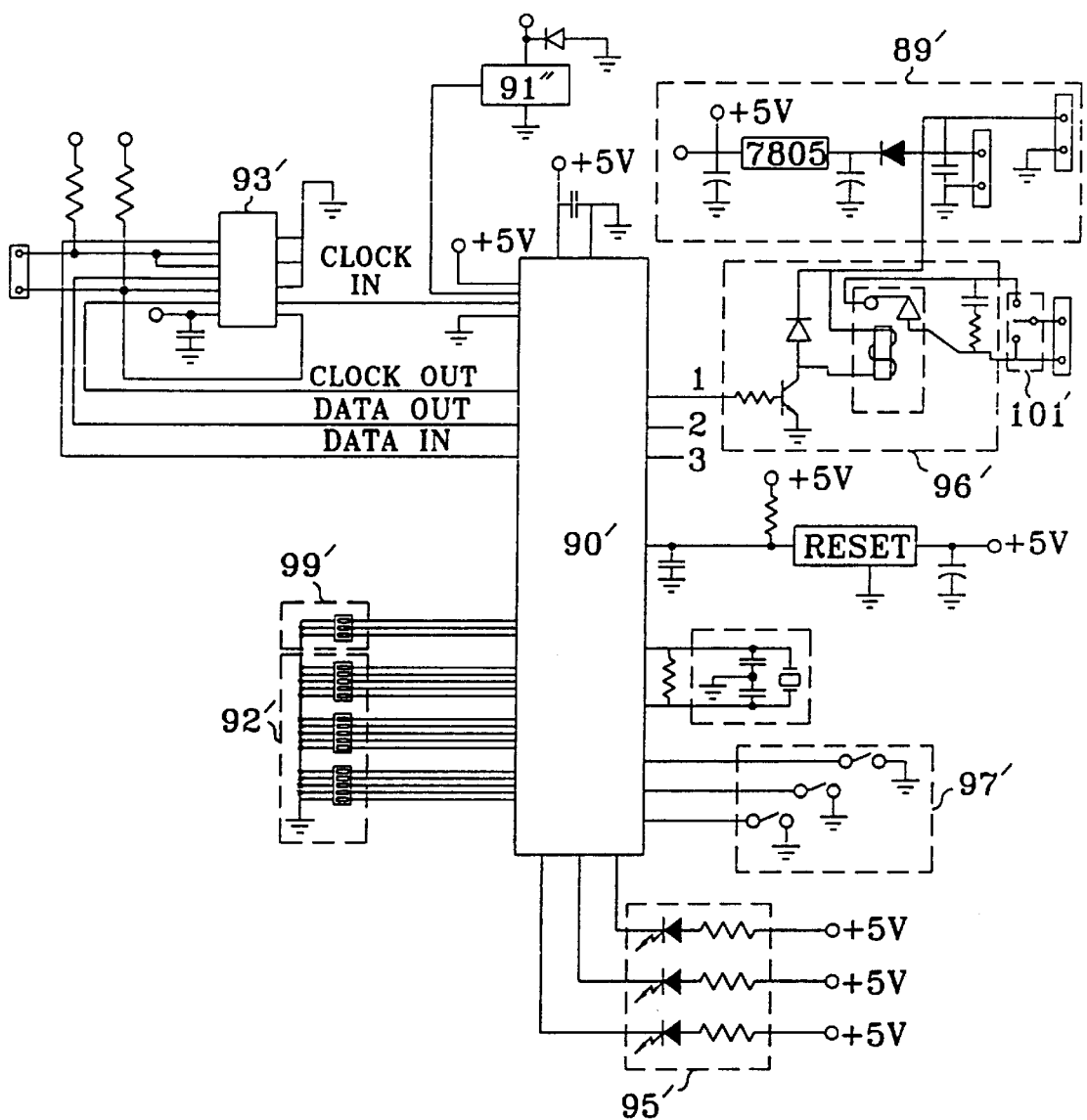

FIG. 2B shows a sub-switching set capable of being used as a subsidiary switch or a spare switch, the devide of which has the same construction and function as that of FIG. 2A, in comparison with the device of FIG. 2A, with the exception that EEPROM for setting an address is replaced with a DIP switch, and a LED display unit 95' and a switching portion 97' are applied only for a directly connected load, and the confirmatory unit 98 for performing an ALL OFF function and confirming a state display of the LED is omitted.

Figure 2C:
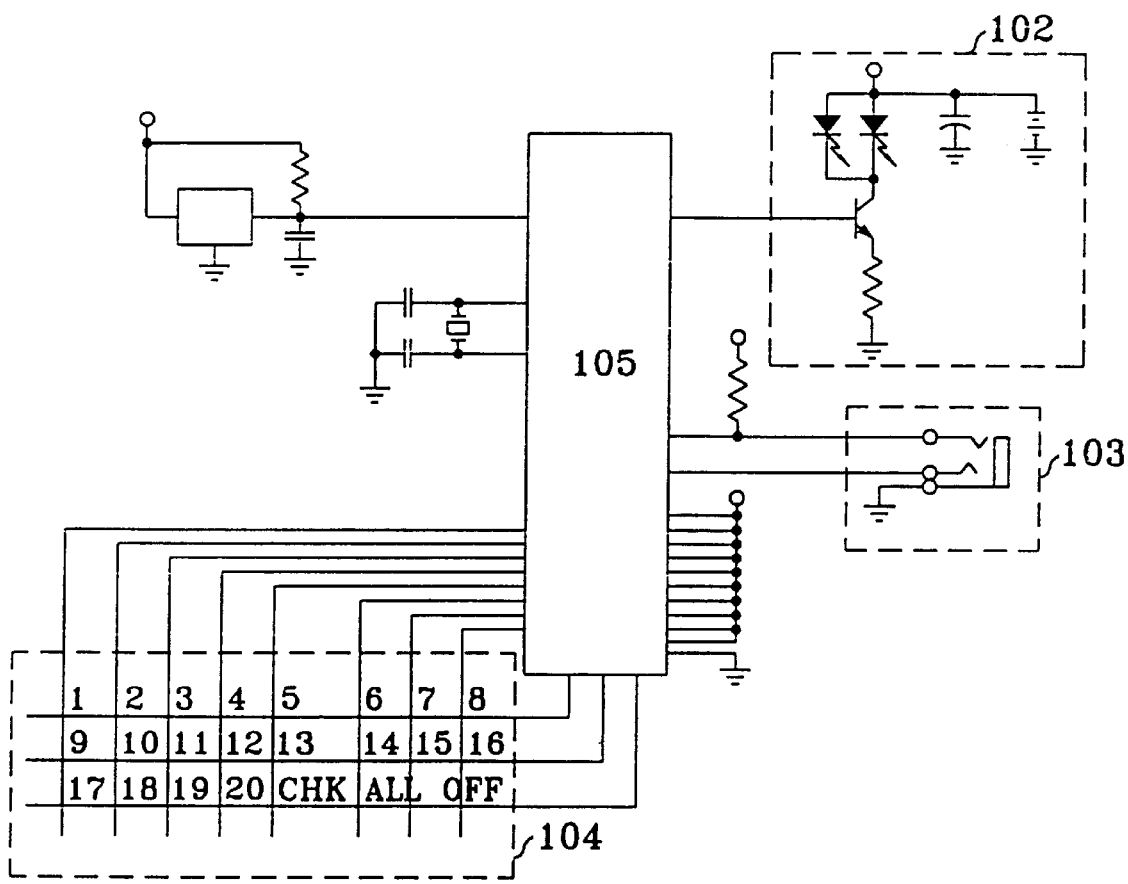

FIG. 2C is a circuit diagram showing a remote controller 107 in which connectors for connecting an external receiver with a remote controller are incorporated, the device of which is for manipulating turning-ON/OFF of each load in the switching system using a telephone line. When a proper number, password and allocation number of the switching system are dialed, a signal applied to the receiver is supplied to the remote controller 107 via an external receiving terminal 103, and an operation of a microcomputer 10D which is incorporated in the remote controller 107 makes turning-ON/OFF of a desired load performed.

Figure 3:
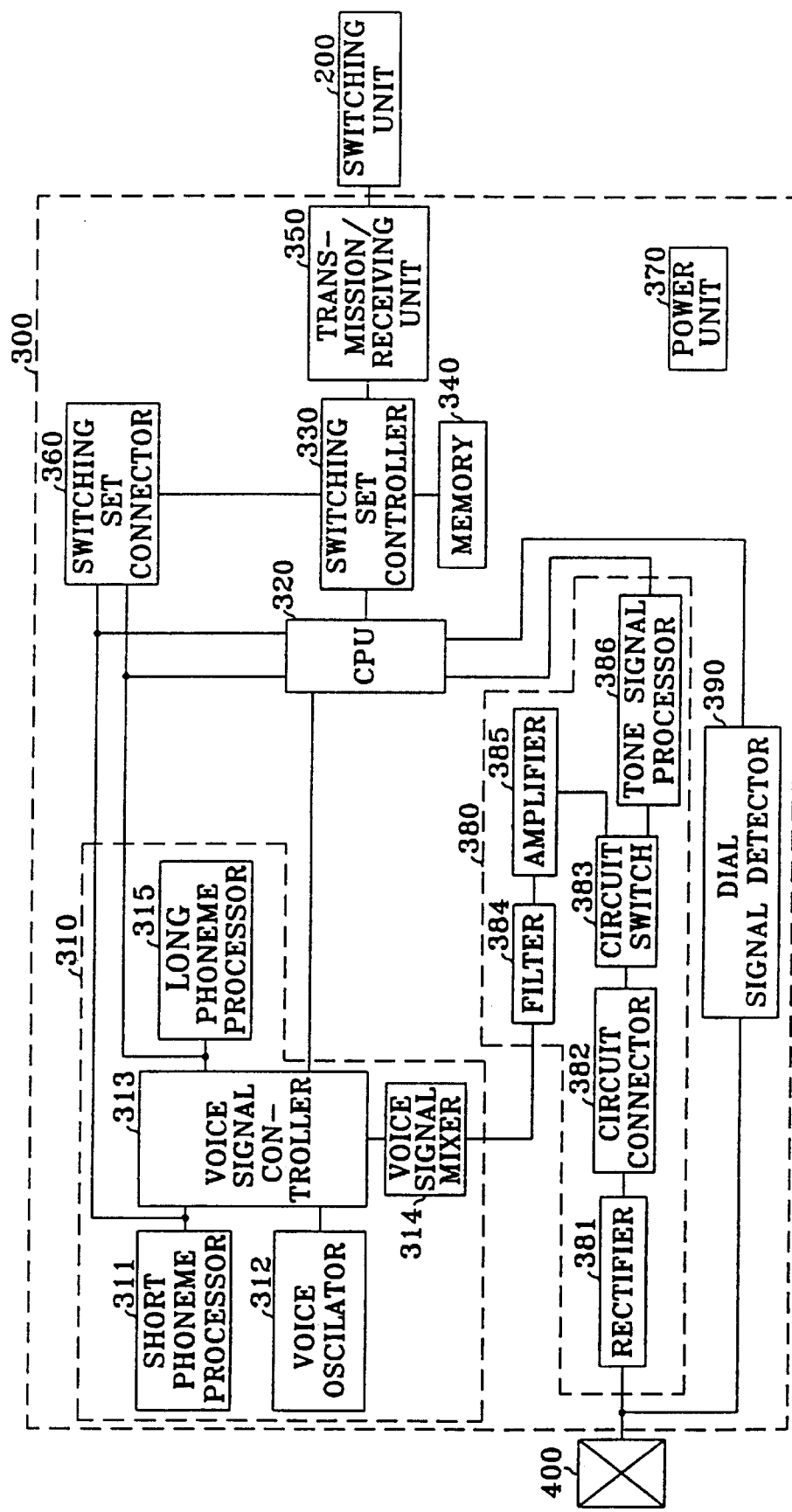
FIG. 3 is a circuit diagram of a switching system in accordance with the present invention.

Described is in detail with reference to FIG. 3 the operation of the telephone line connector which is connected to a main switching set or a sub-switching set of each unit constructed for the switching unit 200 and controls loads of a corresponding unit according to an input command from a specific user, that is a subscriber FIG. 3 is a detailed circuit diagram of the telephone line connector of FIG. 1. As shown, the telephone line connector 300 comprises a central processing unit (CPU, 320) for controlling turning-ON/OFF state of loads associated with the main switching set or the sub-switching set of the switching unit 200 in a voice form according to an input command applied via a telephone line, a switching set controller 330 for mediating signal transmission and receiving between the CPU 320 and the switching means 200 and controlling a signal of an ON/OFF state and a switching operation with regard to a predetermined load, a transmission/receiving unit 350 for transmitting and receiving a signal with regard to the corresponding unit of the switching unit 200 under the control of the switching set controller 330, a voice message outputter 310 for previously storing a predetermined voice message and outputting a voice signal of a corresponding voice message under the control of the CPU 320, a voice signal processor 380 for performing signal-processing to transmit the voice signal from the voice message outputter 310 via the telephone line, and a dial signal detector 390 connected to the telephone line, for detecting a dial signal.

Also, the telephone line connector 300 of the present invention comprises a switching set connector 360 connected between the switching set controller 330 and the CPU 320 for controlling the switching set controller 330 according to the control signal of the CPU 320, an a power unit 370 connected to an analog-to-digital converter 100, for receiving a power source of a direct current and supplying it to respective element units. The switching set controller 330 switches an open/closed element such as a relay (not shown) coupled to the power unit 370 in order to control the operation of the telephone line connector 300 and controls the supply of the power source of direct current being supplied to each element unit. The switching set controller 330 reads out an address allocated for the operation of the open/closed element and switches the open/closed element to be turned on or off.

Describing specifically a structure with regard to each element unit, the voice signal processor 380 comprises a filter 384 for receiving a voice signal from the voice message outputter 310 and filtering a voice grade of the voice signal, an amplifier 385 for amplifying the voice signal filtered by the filter 384 into a proper level, a circuit switch 383 for switching a circuit between the amplifier 385 and a circuit connector 382 in order to output the amplified voice signal to a subscriber or output a tone signal applied via the telephone line to the CPU 320, a circuit connector 382 for connecting and disconnecting the telephone line according to a selection control signal output from the CPU 320, and a rectifier 381 for rectifying the voice signal output from the circuit connector 382 and transmitting the rectified signal to the telephone line.

The voice message outputter 310 comprises a short phoneme processor 311 for outputting phonemic information regarding a short phoneme among voices of voice messages under the control of the CPU 320, a long phoneme processor 315 for outputting phonemic. information regarding a long phoneme among voices of voice messages under the control of the CPU 320, a voice signal controller 313 for outputting voice data corresponding to the phonemic information from the short phoneme processor 311 and the long phoneme processor 315, a voice oscillator 312 for outputting an address corresponding to a predetermined oscillating frequency to output a voice to the voice signal controller 313, and a voice signal mixer 314 for mixing the voice data to a voice signal of an analog form. The voice signal controller 313 presets an address corresponding to predetermined phonemic information of the short phoneme processor 311 and the long phoneme processor 315 and makes a predetermined voice message according to an address with respect to the phonemic information be outputted. The voice message outputter 310, the filter 384 and the amplifier 385 can be integrated into one signal chip.

A memory 340 which receives an address corresponding to information regarding an on/off state of a predetermined load from the switching set controller 330 and stores the address, and outputs information of the corresponding address in response to request of the switching set controller 330, which can be constructed as EEPROM for setting an address. That is, the switching set controller 330 reads out an address with regard to a corresponding load from the memory 340, and discerns the corresponding load communicating with the main switching set or the sub-switching set, or the CPU 320 of each unit.

A control operation with regard to a predetermined load via the telephone line from the external is described as an example. In the embodiment, an on/off state of a third load L3 in a first main switching set 210A is confirmed in voice form via the telephone line under the condition far away from an indoor load (lamp), and the turning-ON/OFF of the corresponding load is controlled via button manipulation of the telephone set by users or subscribers.

The subscriber is connected to the telephone line connector 300 coupled to the exchange 400. When the subscriber inputs a preset telephone number, each element is electrically connected. The tone signal processor 386 detects a tone signal input from the telephone set and outputs the detected signal to the CPU 320. The CPU 320 counts times a telephone bell rings, and outputs a predetermined control signal to the voice message outputter 310 so as to advise voice guidance prepared to confirm the subscriber when the counted times reaches a predetermined times, for example, ten times. The voice message outputter 310 receives a short phoneme and a long phoneme among voices with regard to the corresponding voice message from the short phoneme processor 311 and the long phoneme processor 315, respectively, and outputs a voice signal such as "please input a password" via the voice signal mixer 314. The voice signal output from the voice message outputter 310 is transmitted to the subscriber via the voice signal processor 380. At this time, the CPU 320 controls the circuit connector 382 and makes the voice signal filtered and amplified by the filter 384 and the amplifier 385 circuit-connected.

When the subscriber inputs an assigned password, the dial signal detector 390 outputs a detection signal with regard to the input password to the CPU 320. The CPU 320 judges whether the applied detection signal is a preset password, and outputs a predetermined control signal to the voice message outputter 310 in order to output a corresponding voice guidance message according to the judgment result. The voice signal output to the voice message outputter 310 is transmitted to the subscriber via the voice signal processor 380. In condition that the subscriber inputs the preset password, the CPU 320 controls the voice message outputter 310 to transmit a voice message for confirming the turning-ON/OFF of a predetermined load or that for turning-ON/OFF the predetermined load to the subscriber via the voice signal processor 380.

When the subscriber presses a button, for example number 3, to confirm the on/off state of a third load L3 in the main switching set 210A, the CPU 320 which receives a detection signal of the button number 3 from the dial signal detector 390, is interfaced with the switching set controller 330 to receive information concerning the on/off state of the third load L3, and controls the voice message outputter 310 and the voice signal processor 380 to then output a voice message with regard to the on/off state of the third load L3. At this time, the switching set controller 330 transmits a signal for detecting the on/off state of the third load L3 to the transmission/receiving unit 350, and a transmitter/receiver of each unit connected to the transmission/receiving unit 350 judges whether the input signal is a preset signal. The main switching set 210A reads out the on/off stare of the third load L3 and transmits the read signal to the transmission/receiving unit 350. Accordingly, the CPU 320 receives information regarding the on/off state of the third load L3 and outputs it in a voice message form.

In the case that the third load L3 of the first main switching set 210A is turned on or off according to the informed voice message in condition that the subscriber inputs an assigned password, the CPU 320 outputs the control signal for turning-ON or turning-OFF of the third load L3, and the switching set controller 330 applies a driving signal for turning-ON or turning-OFF of the third load L3 to the first main switching set 210A via the transmission/receiving unit 350, and the first main switching set 210A turns on or off the third load L3, and then reads out the turning-ON/OFF of the third load L3 to output the read result to the transmission/receiving unit 350. Next, the CPU 320 controls the switching set controller 330 to output the turning-ON/OFF of the third load L3 to be voice-outputted and transmitted to the subscriber.

The operation that the main switching set or the sub-switching set of each unit detects the on-off state of a corresponding load or performs the turning-ON/OFF by manual manipulation or remote control with a remote controller, is functionally equal, except for only the fact that a manipulation command is applied via the telephone line connector 300.

The above embodiment describes the operation of confirming the turning-ON/OFF of a load and turning on/off the load by communicating with the first main switching set 210A, but it can be fully understood by those of ordinary skill in the art that the operation can be identically applied to a load connected to any main switching set or sub-switching set.

Also, the switching system of the present invention can be properly modified and applied to a preventive system without limiting to this embodiment, and thus can be fully embodied within an application range based on technology of the present invention.

The present invention described above can confirm a turning-on/off state of a corresponding load and perform a switching operation, listening a voice message being informed via a telephone line, as well as control any load installed in isolated places from each other by manipulating a manual switch and a remote control switch, thereby conveniently controlling the load according to a desired switching method regardless of places or situations. Particularly, the switching system is useful to control any loads via the telephone line during absence or in far isolated places. In the case that the system is associated with a burglar alarm system for crime prevention, it provides great effect that can adaptively cope with emergency.

INDUSTRIAL APPLICABILITY

As described above, a switching system in accordance with the present invention can effectively use and manage all loads connected thereto, and thus provide wide-spread utilization in an industrial field as well as good power-saving efficiency in use of various electric and electronic appliances for house and working places.

What is claimed is:

1. A system for controlling and switching a power source for switching input power supplied to a plurality of loads, comprising:

a plurality of switching sets for controlling the plurality of loads;
a telephone line connecting unit connected to the switching sets and to a telephone, by which a state of the switching sets is monitored and controlled through the telephone, and results of the monitoring and controlling are outputted to a user as a voice message,
wherein the telephone line connecting unit comprises,
a central processing unit (CPU) interfaced with a switching set controller, for controlling an output operation of a voice message according to an input command applied via a telephone line,
a switching set controller interfaced with the CPU, for outputting a control signal to turn on/off one of the loads,
a transmission/receiving unit for transmitting the output control signal of the switching set controller to one of the loads, and supplying the received response signal to one of the switching sets,
a voice message outputter for outputting at least one voice message from a plurality of pre-stored voice messages under the control of the CPU,
a voice signal processor for performing signal processing to transmit the voice messages of the voice message outputter via the telephone line upon detecting a tone signal from the user, and
a dial signal detector for detecting a dial signal received via the telephone line,
wherein the voice message outputter includes,
a short phoneme processor for outputting phonemic information regarding a short phoneme portion of the voice messages under the control of the CPU,
a long phoneme processor for outputting phonemic information regarding a long phoneme portion of the voice messages under the control of the CPU,
a voice signal controller for outputting voice data corresponding to the phonemic information output from the short and long phoneme processors,
a voice oscillator for ouputting an address corresponding to a predetermined oscillating frequency to output a voice to said voice signal controller, and
a voice signal mixer for mixing the voice corresponding to the voice address to a voice signal of an analog form.

2. The switching system as claimed in claim 1, wherein said voice signal processor comprises a filter for receiving the voice signal from said voice message outputter and filtering a voice grade of the voice signal;
an amplifier for amplifying the voice signal filtered by said filter into a proper level;
a circuit switch for switching a circuit between said amplifier and a circuit connector in order to output the amplified voice signal to the subscriber or output a tone signal applied via the telephone line to said CPU;
a circuit connector for connecting and disconnecting the telephone line according to a selection control signal output from said CPU; and
a rectifier for rectifying the voice signal output from said circuit connector and transmitting the rectified signal to the telephone line.

3. The switching system as claimed in claim 1, wherein said switching set controller further comprises a memory for storing an address allocated for the operation of an open/closed element to switch the supply of a power source of said telephone line connector.

4. The switching system as claimed in claim 1, wherein said voice message outputter outputs a predetermined voice message according to an address for present phonemic information.

5. The switching system as claimed in claim 1, wherein said switching set controller is interfaced with the main switching set of each unit and said CPU according to the preset address to discern a corresponding load.

6. The system according to claim 1, wherein the switching sets comprises:
- a main switching set for monitoring states of respective loads and controlling all the loads according to result of the monitoring; and
- a sub switching set for controlling loads which are connected to the sub switching set in accordance with commands from the main switching set.

7. The system according to claim 6, wherein the main switching set comprises:
- a transmit/receive unit for inputting/outputting signals with the telephone line connecting unit;
- a display unit for displaying on/off states of the respective loads;
- a switching unit including switches controlling the respective loads; and
- a controlling signal generating unit for controlling the display unit, the first switching unit and the transmit/receive unit according to a command signal inputted form the transmit/receive unit.

8. The system according to claim 6, wherein the sub switching set comprises:
- a transmit/receive unit for inputting/outputting with the telephone line connecting unit;
- a display unit for displaying on/off states of the loads which are connected to the sub switching set;
- a switching unit including switches for controlling the loads connected to the sub switching set; and
- a controlling signal generating unit for controlling the display unit, the switching unit and the transmit/receive unit according to a command inputted from the transmit/receive unit.

* * * * *